April 24, 1934.    E. HEITMAN    1,956,027
REFRIGERATING APPARATUS
Filed Nov. 30, 1932
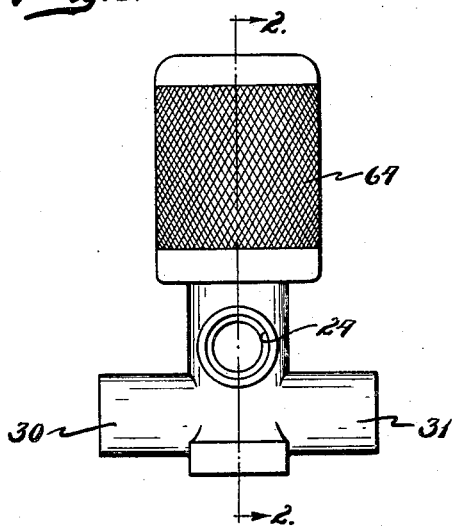
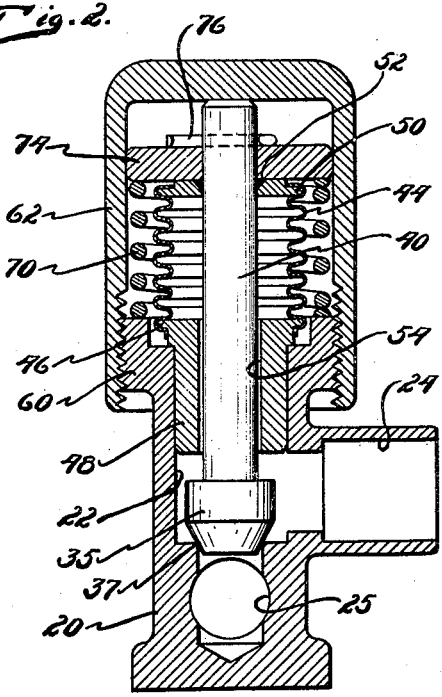
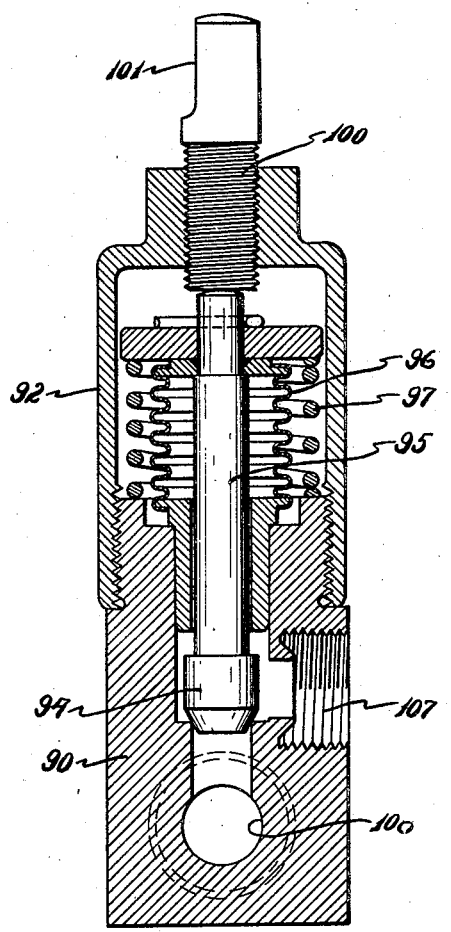
INVENTOR.
EDWARD HEITMAN
BY
Ralph E. Baker
ATTORNEY.

Patented Apr. 24, 1934

1,956,027

UNITED STATES PATENT OFFICE 1,956,027

REFRIGERATING APPARATUS

Edward Heitman, Detroit, Mich., assignor to Kelvinator Corporation, Detroit, Mich., a corporation of Michigan Application November 30, 1932, Serial No. 645,025

2 Claims. (Cl. 251—141)

This invention relates to refrigerating apparatus, and more particularly to refrigerant control devices for use in such apparatus.

One of the objects of my invention is to provide a simplified, improved packless valve which is inexpensive to manufacture and which is constructed to operate for a long period of time.

Another object of my invention is to provide an improved packless valve in which the valve proper is operated from the exterior of the valve device through a flexible wall, and to arrange for operating said valve proper by merely flexing said wall without twisting or applying a force thereto which would tend to twist same whereby to insure long life of the device.

Further objects and advantages of the present invention will be apparent from the following description, reference being had to the accompanying drawing, wherein a preferred form of the present invention is clearly shown.

In the drawing:

Fig. 1 is a view in elevation of a valve embodying features of my invention;

Fig. 2 is an enlarged view, taken along line 2—2 of Fig. 1; and

Fig. 3 is a view similar to Fig. 2 of a modified form of valve embodying features of my invention.

Referring to the drawing, and particularly to Figs. 1 and 2, the numeral 20 designates, in general, a casing having a bore 22 which serves as a chamber for fluid. The casing is also provided with an inlet 24 and an outlet 25 for the passage of fluid to and from the chamber 22. As shown in Fig. 1, the casing 20 is provided at the lower part thereof with two laterally extending portions 30 and 31. The outlet 25 is provided in the portion 31 and a second outlet (not shown) is provided in the portion 30.

Within the chamber 22 there is disposed for movement a valve proper 35 which cooperates with a valve seat 37 to control the passage of fluid through the chamber 22. To the valve proper there is joined, preferably integrally, a push rod or actuator 40 for actuating the valve proper 35.

In order to provide a packless valve and one which is sealed against leakage of fluid from the chamber 22, I have provided flexible means which permits operation of the valve proper from the exterior of the chamber 22, but which hermetically seals said chamber against leakage. This flexible means constitutes a flexible bellows 44. This bellows is sealed on one end thereof to a shoulder 46 of an annular sleeve 48, which is preferably press-fitted into bore 22, to prevent the escape of fluid between the outer wall of sleeve 48 and bore 22. The opposite or upper end of bellows 44 is sealed to an annular ring 50, which is preferably welded or soldered to the push rod 40 as at 52. The sleeve 48 is provided with a bore 54 in the central portion thereof slightly larger than the push rod 40 to permit the rod to move up and down therein.

The casing 20 is provided with an enlarged screw threaded portion 60 to which is secured a movable hollow cover 62 which is screw threaded to cooperate with the threaded portion of the enlarged threaded portion 60 of casing 20. Preferably, the exterior of the cover 62 is knurled as at 64 to facilitate the turning thereof.

As shown in Fig. 2, the valve is in engagement with its seat. In order to open the valve, I have provided a coiled spring 70 which surrounds the bellows and push rod and is disposed within the cover 62. The spring 70 is arranged so that one end abuts the enlarged portion 60 of casing 20 and the upper end of the coiled spring applies its force to an annular shoulder or ring 74 which is secured to push rod 40 by key 76 immediately above ring 50. When the valve is in a closed position, the spring is under compression so that the moving of cover 62 upwardly on the extension 60 of casing 20 permits the valve and push rod to follow such upward movement to open the valve to the extent desired.

When the valve is in an open position, the turning of the cover 60 in a direction which causes it to move downwardly on the casing will cause the valve proper to move downwardly toward closing position, by reason of the fact that the underside of the top wall of cover 62 is in engagement with the push rod 40 at all times.

From the foregoing, it will be apparent that the movement of cover 62 will cause movement of push rod 40 and valve 35. It will also be noted that the points of contact between the cover and the end of push rod 40 are small and that a relatively small slidable contact therebetween is provided which will readily permit the cover to be rotated about the end of push rod 40 with but a negligible amount of friction. This prevents twisting of the bellows and aids in insuring long life to the valve device.

Valves of the type hereinbefore described have been found suitable for controlling the flow of refrigerant in refrigerating systems. Although the valve shown in Figs. 1 and 2 is provided with two outlet passages, it is to be understood that one may be omitted or more added, if desired.

In Fig. 3 of the drawing there is shown a modified form of valve structure suitable for use in connection with refrigerating systems. This valve structure comprises, in general, a casing 90 which is provided with a stationary cover 92. Within the casing 90 and cover 92, I have disposed a valve proper 94, push rod 95, bellows 96 and spring 97, which correspond to valve 35, push rod 40, bellows 44 and spring 70, respectively, shown in Fig. 2. These parts are substantially the same as those shown in Fig. 2 and operate substantially the same, excepting that the push rod 95 is actuated on its downward movement by means of a threaded member 100, which extends through the top wall of the stationary casing 92. The threaded member 100 is provided with a flat portion 101 for receiving a suitable tool for turning the member 100. By this arrangement the turning of the member 100 in a certain direction will cause upward movement thereof and at the same time the spring 97 will urge the push rod 95 and valve proper 94 upwardly the same distance which the member 100 moves upwardly. Likewise the turning of the member 100 in the opposite direction will cause it to move downwardly in the cover 92 when the valve 94 is in open position. This causes the push rod 95 to urge the valve 94 downwardly toward valve closing position. The casing 90 is provided with a fluid chamber 105, a fluid inlet 107 and fluid outlet 108. If desired, the casing 90 may be provided with two outlets like the valve shown in Figs. 1 and 2, or may be provided with but the single outlet 108.

With the arrangement shown in Fig. 3, it will be noted that the lowermost portion of the threaded member 100 contacts with the uppermost portion of the push rod 95 by a slidable connection for actuating the valve 94 when the threaded member 100 is turned in one direction and permits the spring to actuate the valve when turned in the other direction. It will also be noted that this slidable connection is substantially an anti-friction connection and that the uppermost portion of the push rod 95 is provided with an arcuate portion so as to eliminate substantially the possibility of twisting of the bellows when the member 100 is being actuated to operate the valve 94. By preventing twisting of the bellows 96, long life of the valve device is insured.

Although only a preferred form of the invention has been illustrated, and that form described in detail, it will be apparent to those skilled in the art that various modifications may be made therein without departing from the spirit of the invention or from the scope of the appended claims.

What I claim is:

1. In a valve, a casing having a chamber for fluid and inlet and outlet passages for the flow of fluid through said chamber, a valve proper disposed within said chamber for controlling the flow of fluid therethrough, flexible means sealing said chamber at one end thereof against leakage of fluid, a push rod associated with said flexible means and valve proper for actuating said valve proper, a movable cover for said flexible means, said cover being screw threaded to said casing, means within said cover tending to move said flexible means and push rod toward a valve opening position, and said cover being movable to actuate said flexible means and push rod in the opposite direction.

2. In a valve, a casing having a chamber for fluid, and inlet and outlet passages for the flow of fluid through said chamber, a valve proper disposed within said chamber for controlling the flow of fluid therethrough, a sleeve having an annular shoulder, said sleeve being rigidly secured in said casing and being provided with an aperture, a push rod associated with said valve proper and extending through said aperture, a ring sealed to said push rod, said ring having an annular shoulder, a tubular flexible bellows surrounding said push rod and having one end thereof sealed to said annular shoulder on said ring and its opposite end sealed to said annular shoulder on said sleeve, a coiled spring arranged so as to tend to move said push rod and valve proper at all times in one direction, and means for moving said valve proper in an opposite direction.

EDWARD HEITMAN.